Dec. 17, 1940.   W. B. BARNES   2,225,493
AUTOMATIC TRANSMISSION SHIFT
Filed Jan. 25, 1938   6 Sheets-Sheet 1

INVENTOR.
William B. Barnes,
BY
Hood + Hahn.
ATTORNEYS.

Dec. 17, 1940.  W. B. BARNES  2,225,493
AUTOMATIC TRANSMISSION SHIFT
Filed Jan. 25, 1938   6 Sheets-Sheet 3
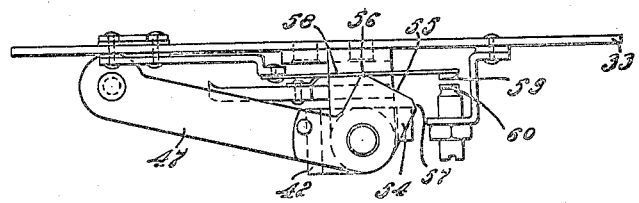
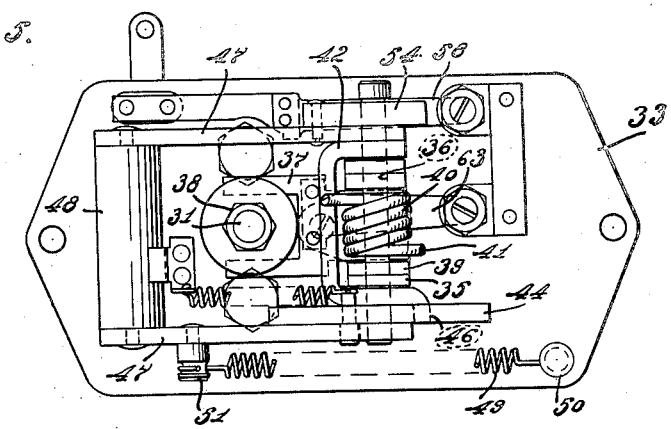
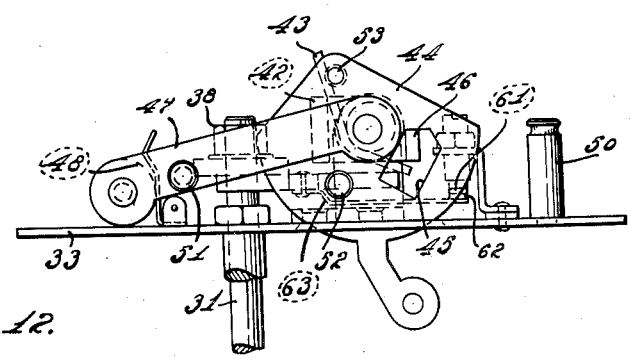
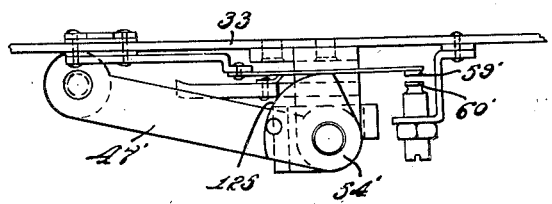
INVENTOR.
William B. Barnes,
BY
Hood & Hahn.
ATTORNEYS.

Dec. 17, 1940.  W. B. BARNES  2,225,493
AUTOMATIC TRANSMISSION SHIFT
Filed Jan. 25, 1938  6 Sheets-Sheet 4

INVENTOR.
William B. Barnes,
BY
Hood & Hahn.
ATTORNEYS.

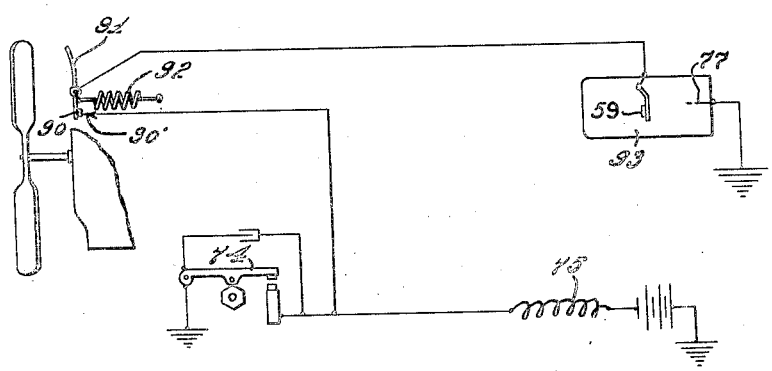
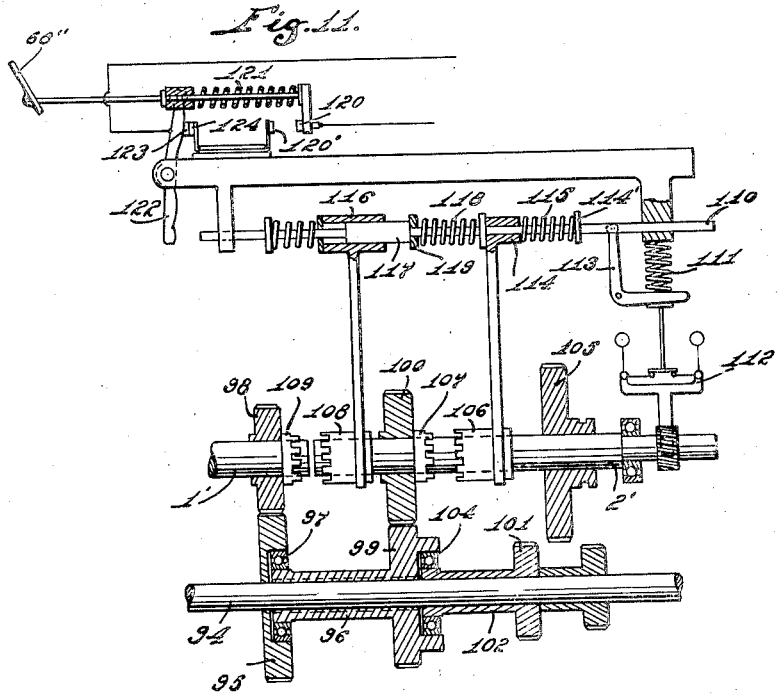

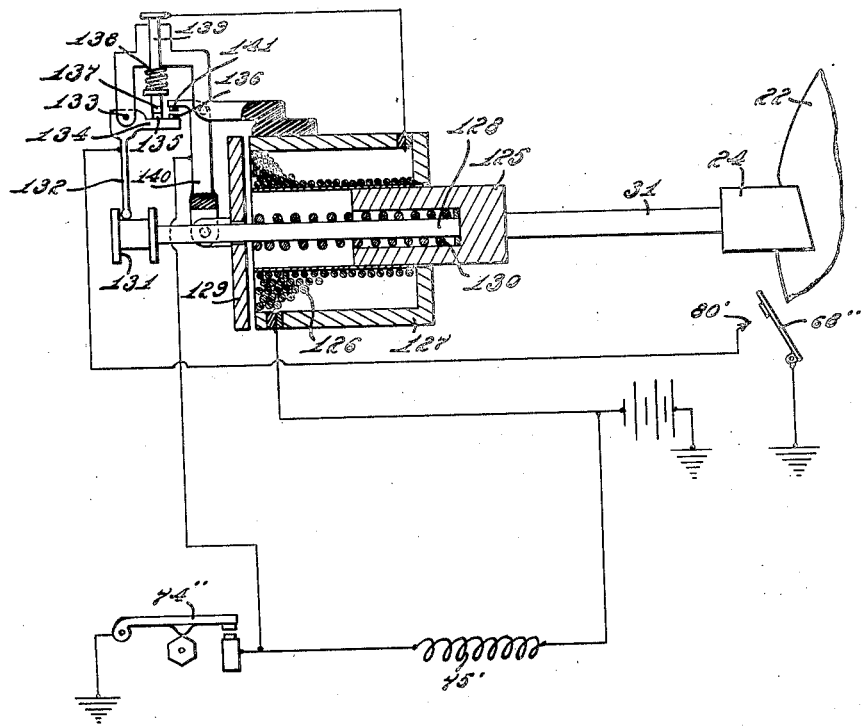

Patented Dec. 17, 1940

2,225,493

UNITED STATES PATENT OFFICE 2,225,493

AUTOMATIC TRANSMISSION SHIFT

William B. Barnes, Muncie, Ind., assignor to Barnes Motor Developments Company, Muncie, Ind., a partnership composed of said William B. Barnes and Freda Arthur Barnes Application January 25, 1938, Serial No. 186,888

53 Claims. (Cl. 74—472)

My invention relates to improvements in transmission gearing and particularly to speed changing gears adapted primarily for use in automobiles and other power driven vehicles.

It has for one of its objects that of providing means whereby the driven shaft of an automobile or like vehicle may be driven at a different speed from that of the driving shaft, easily controllable, and which may be if desired, controlled from the same member which controls the engine throttle.

More specifically, my invention relates to an improved form of transmission control whereby the shift from one speed to another may be effected simply by the removal of the driving torque of the power producing element from the driving shaft for a predetermined period of time. Further advantages and objects will appear more fully hereinafter in the accompanying specification and claims.

For the purpose of disclosing my invention, I have illustrated in the accompanying drawings certain embodiments thereof.

In said drawings:

Fig. 5 is a side elevation of the mechanism for controlling the operation of the transmission;

Fig. 6 is a top plan view thereof, certain parts being left out for the purpose of clearness;

Fig. 7 is a bottom plan view thereof, certain parts thereof being left out for clearness;

Fig. 10 is a diagrammatic view of a further modification thereof;

Fig. 11 is a side elevation, more or less diagrammatic, of a modification of my invention;

Fig. 12 is a plan similar to Fig. 6 of a modification of the structure illustrated in Fig. 6; and Fig. 13 is a diagrammatic view of a further modification of the invention wherein a solenoid is used for moving the dog 24 into released position.

Figures 1, 2:
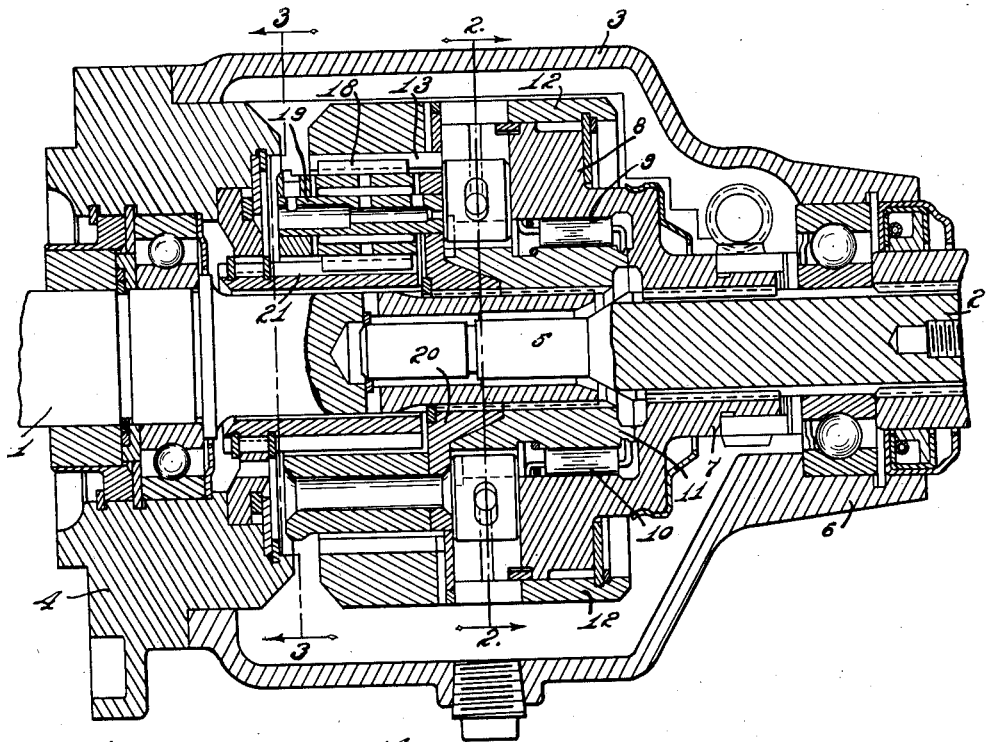
Fig. 1 is a longitudinal sectional view of a transmission embodying my invention.
Fig. 2 is a sectional view taken on the line 2—2 of Fig. 1.

Referring first to the structure illustrated in Figs. 1 to 4, wherein I have shown a type of transmission particularly adaptable for the embodiment of my invention, the structure shown in these figures is a type of overdrive wherein the driven shaft 2 is driven when the gearing is operative at a higher speed than the driving shaft 1 through the medium of a planetary type of gearing. In this embodiment, this type of gearing is adapted to be mounted at the rear of the ordinary three-speed and reverse transmission gearing now commercially used in automobiles and is adapted for the purpose of "overdriving" the shaft 2 from the shaft 1 after the driving shaft has been directly connected to the engine through the medium of the standard transmission.

In the embodiment illustrated, I provide a casing 3 into which, through the front wall 4 thereof is projected the driving shaft 1. This driving shaft has piloted therein the forward end 5 of the driven shaft 2 which is projected into the casing through the rear wall 6 thereof. Both shafts have suitable ball or roller bearing mountings in the walls of the casing. Preferably splined on the driven shaft 2 is a hub 7 carrying a head 8 overhanging the front end of the hub and this head is provided with an inner annular face 9 forming one member of an overrunning clutch which includes additionally the rollers 10 and an inner member 11 telescoping the member 8 and having suitable peripheral cam surfaces. These cam surfaces are so arranged that, when the driving shaft, to which the inner member 11 is splined, drives the inner member in a clockwise direction, the cammed surfaces will cause the rollers 10 to wedge the inner and outer members together to provide driving connection between the driving and driven shafts. However, in event the driven shaft 2 overruns the driving shaft 1, these rollers will ride down their cammed surfaces permitting the shaft 2 to rotate independently of the shaft 1.

In addition to the overrunning clutch member 9, the head 8 also carries a cylinder 12, which is rotatable on the head and is provided at its outer end with an internal ring gear 13 of a planetary gear drive. Also mounted in the head 8, in a series of radial slots formed therein, are a series of radially movable dogs 14 which, in their retracted position, engage in peripheral notches 15 formed in the member 11 and thereby directly connect the member 11 to the member 8 to establish a direct two-way drive between the shaft 1 and the shaft 2. These dogs are biased in their retracted position by suitable biasing springs 16 and when these dogs are moved outwardly and engage in suitable slots 17 in the cylinder 12, the cylinder 12 and its associated ring gear is connected to the head 8 and through the head 8 with the driven shaft 2.

The pinion gears 18 of the planetary gear drive are mounted on suitable shafts 19 carried on a pinion carrier 20 in turn splined to the driving shaft 1 and these pinion gears likewise mesh with a sun gear 21 surrounding the driving shaft 1 and splined to a holding disc 22. This holding disc is adapted to normally remain in a non-rotatable condition and to this end, the outer periphery of the disc is provided with a series of peripheral notches 23, any one of which is adapted to receive a radially movable dog 24 mounted in a slot in the front wall 4 of the casing, and, while being radially movable, is held against rotation.

So much of the structure as has been described operates to drive the driven shaft 2 from the driving shaft 1, either at the same speed as the driving shaft 1 or at a higher rate of speed. With the parts in the position shown in Figs. 1 and 2, that is, with the dogs 14 retracted and engaging in a pair of slots or recesses 15, there is a direct two-way drive established between the shafts 1 and 2. At the same time, the driving shaft is operating the pinion carrier and, due to the fact that the sun gear is held stationary, the ring gear and with it the cylinder 12, is being driven through the pinion gears and at a stepped up speed. When the speed of the driven shaft and for that matter the driving shaft also reaches a point where centrifgal force causes the dogs 14 to move outwardly, these dogs become disengaged from the slots 15, thereby disconnecting the two-way drive between the shafts 1 and 2, although a one-way drive will be maintained between the shafts by the means of the overrunning clutch. It being remembered that the cylinder 12 is driven at a greater speed than the head 8, the dogs will not, due to their construction, engage in the slots 17. However, as soon as the operator slightly decreases the speed of the shaft 1 until the rotative speed of the dogs 14 and the slots 17 is approximately at synchronism, the dogs will engage in their slots and afterwards, by increasing the speed of the shaft 1, a two-way drive will be established between the shafts 1 and 2 through the planetary gearing with the shaft 2 being driven at a greater speed than the shaft 1.

When the above-described structure is being used for the driving of an automobile, there are occasions where it is desirable to establish a one-to-one drive between the shafts 1 and 2 without dropping the speed of the shaft 1 to the point where the coiled spring 16 will overcome centrifugal force to cause the dogs 14 to be retracted. This can be accomplished by permitting the sun gear to rotate and under these circumstances, with the sun gear rotating, the planetary gear mechanism becomes ineffective for establishing a drive between the shafts 1 and 2 even though the dogs 14 are engaged to lock the ring gear to the drive shaft, and a drive will be established between the shafts 1 and 2 through the overrunning clutch.

Figure 3:
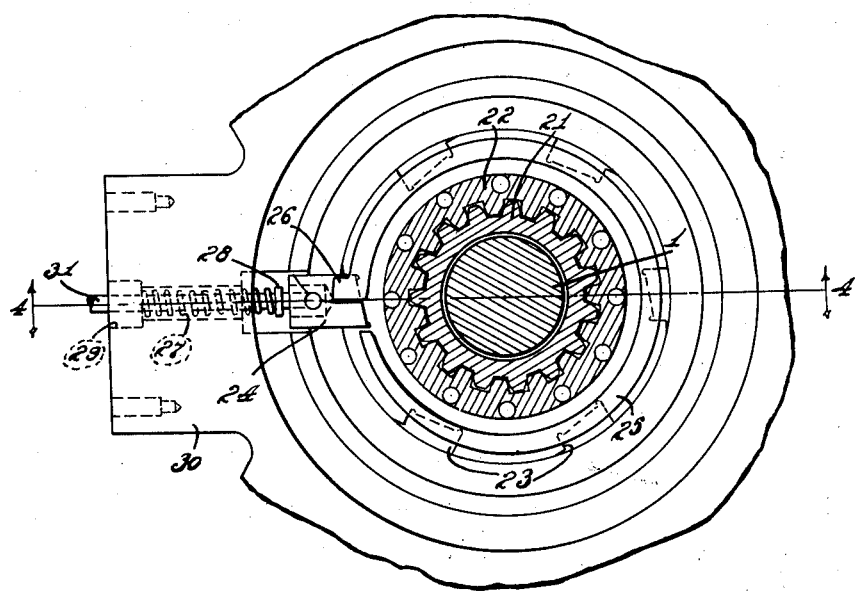
Fig. 3 is a transverse sectional view taken on the line 3—3 of Fig. 1, looking in the direction of the arrows, with holding ring removed.

To this end, I provide the releasable means in the form of the radially movable dog for holding the sun gear non-rotatable. Referring to Fig. 3, the dog 24, when in engagement with one of the slots 23, prevents rotation of the holding disc 22 and with it, the sun gear member 21. As long as there is a drive established between the driving and driven shafts through the planetary gearing, this dog 24 is under load and this load is sufficient to prevent, except by undue force, the radial outward movement of the dog from the slots 23. In other words, the dog 24 will release only under no load conditions. If, however, no load conditions will be established on the dog as, for instance, the removing of the driving torque on the shaft 1, then this dog 24 may readily be withdrawn from the slots. When the dog is so withdrawn, I preferably provide what I have termed a balk ring 25, having an end 26 which, when the dog is moved outwardly, will be moved beneath the dog or a portion thereof by the frictional rotation imparted to the balk ring to prevent reengagement of the dog as long as the parts are operating in one direction. However, if there is a tendency for the parts to reverse, the balk ring will be moved in the opposite direction to permit the dog to drop into place.

The dog 24 is biased in an engaging direction to a comparatively light spring 27 interposed between a collar 28 and a stationary plug 29 in a portion 30 of the casing and surrounding an operating stem or rod 31, the lower end of which is provided with a pin 32 operating in an opening in the dog.

Figure 4:
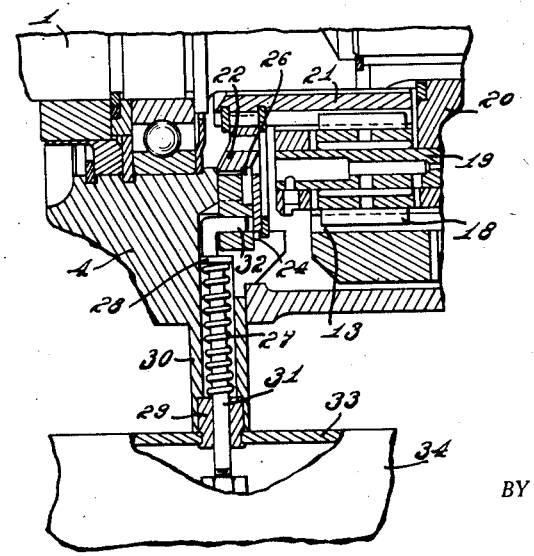
Fig. 4 is a fragmentary detailed section taken on the line 4—4 of Fig. 3, certain parts thereof being shown in full.

In order to provide an automatic means or semi-automatic means, within the control of the operator of the vehicle, for removing the driving torque from the driving shaft and releasing the dog 24, I provide a combined switch and tension mechanism illustrated in Figs. 5, 6 and 7. This structure may be mounted on one side of the transmission casing, as illustrated in Fig. 4, on a base 33 and within a housing 34. On the base 33, I provide a pair of spaced apart outwardly projecting supporting lugs 35 carrying a shaft 36. This shaft 36 has mounted thereon a fork-shaped operating lever 37, the fork of which is adapted to receive the operating stem 31 provided at its upper end with a stop or nut 38 to move the stem 31 in a direction to withdraw the dog 24 from the recesses. This lever 37 is provided with a pair of arms 39 receiving the shaft 36 so that the lever 37 is mounted in a plane, although pivotally mounted on the shaft 36, different from the shaft. A coiled spring 40 surrounds the shaft 36 and has one end 41 adapted to bear on the rear end of the forked lever 37 to bias this lever, when the spring is placed under tension, in a direction outwardly or in a direction to move the dog 24 out of the recesses 23, it being borne in mind that when this spring 41 is under tension it is sufficiently strong to overcome the spring 27.

For the purpose of placing the coiled spring under tension, I provide a stirrup-shaped arm 42 likewise pivotally mounted on the shaft 36 and adapted to bear on the opposite end 43 of the coiled spring. This stirrup-shaped operating arm is in turn operated by an operating lever 44 also rotatably mounted on the shaft 36 and provided with a slot 45 adapted to receive an outwardly turned projection 46 on one of the arms of the stirrup-shaped lever. The upper wall of this slot 45 is adapted to bear on the end 46 for the purpose of rotating the stirrup-shaped lever on the shaft to place the spring under tension when the lever 44 is moved to the left looking at Fig. 7. Due to this slot however a lost motion connection is established between the lever 44 and the stirrup lever 42 so that the lever 44 may continue in its movement to the right, looking at Fig. 7, after the stirrup lever 42 has come to rest with the spring 40 in an unstressed condition.

In operation, the parts, so far as described, when the lever 44 is moved to the left, looking at Fig. 7, the coiled spring 40 will be placed under tension or stress, thereby tending to move the rod 31 in a direction to release the dog 24. It will be borne in mind, however, that due to the fact that the dog 24 is under load conditions the spring 40 is not powerful enough, so long as these load conditions exist, to withdraw the dog 24 from its holding position. In order therefore that a no-load condition may be established on the dog 24 I provide a means whereby when the coiled spring is placed under tension by the operation of the lever 44 the ignition circuit of the driving engine, which I have illustrated as a gasoline engine, is interrupted thereby causing the motor to "miss" a stroke or two thus imposing no driving load on the driving shaft and during this period the dog 24 is therefore under no load conditions and will snap out of its holding position.

To accomplish the above, I provide a pair of arms 47 likewise pivotally mounted on the shaft 36 and connected together by a weighted member 48. These arms are moved or "snapped" from one position to another by a coiled spring 49, one end of which is connected to a stationary stud 50 on the base 33 and the other end of which is connected to a stud 51 on one of the arms 47. This spring is so arranged with relation to the pivotal center of the arms that when the arms are in one position or the other past dead center, the arms will be moved in one direction or the other by this spring. The initial movement in one direction or the other is imparted to the arms through the medium of a pair of pins 52 and 53 on the lever 44, the pin 52 being so placed on the lever that when it has been moved past the position placing the spring 40 under tension, it will engage one of the arms 47 and kick it past dead center, after which the arms 47 will be snapped to the limit of the outer movement by the spring 49. Likewise, the pin 53 is so positioned on the lever 44 that when it is moved in the opposite direction for a portion of its movement, it will move the arms 47 inwardly toward the base past the dead center, after which the arms will be snapped into their full retracted position. This lever construction, including the arms 47, is provided with an operating cam 54 having a flattened surface 55 and two end portions 56 and 57. This cam member is adapted to control a switch arm 58 carrying a contact 59 adapted, under certain conditions, to engage a stationary contact 60. When the lever is in its full retracted position, as will be seen in Fig. 6, the arm 58 is in a position to maintain the contacts 59 and 60 open. As the lever moves to its projected position, when the flattened portion 55 becomes parallel with the spring arm 58, the contacts 59 and 60 will close and after the lever has moved past this position, to cause the end portion 57 to engage the arm 58, the contacts 59 and 60 will again be opened so that the arms 47, during their movement from retracted to projected position, will only momentarily close the contacts 58 and 59. However, it will be noted that the arms 47 cannot be maintained in a position whereby the contacts 49 and 50 can be kept closed due to the spacing of the pins 52 and 53.

In operation, the lever 44 is adapted to be connected to the accelerator pedal of the driving engine and in such a manner, after the accelerator pedal has been moved to open throttle condition, a continued movement in the same direction as the accelerator pedal will first move the lever sufficiently to place the spring 40 under tension and then initiate the movement of the arms 49 into projected position, so that first the pull-out spring 40 is placed under tension to pull the dog 24 out of holding position and immediately thereafter, the ignition system is interrupted momentarily to relieve the dog of driving load so that the spring 40 will release the dog. The timing of the movement of the arms 47 to outer position may be regulated by varying the size of the weighted member 48 so that a comparatively long dwell may be made with the contacts 59 and 60 in engaged or closed position.

In order to insure a more or less momentary interruption in the ignition circuit, I provide a pair of supplemental contacts 61 and 62. These contacts are normally closed. The contact 62 is mounted on a spring arm 63 carried on the forked lever 37 and extending rearwardly therefrom. It will be remembered that this forked lever, when the spring 40 is placed under tension, is adapted to move the restraining dog 24 to its released position and therefore, in view of the fact that the contacts 62 and 61 are in series with the contacts 59 and 60, in order to get an interruption in the ignition circuit, both sets of contacts must be closed. Therefore, as soon as the holding dog 24 is moved to released position, the spring arm 63, moving with the forked lever 37, will open the contacts 61 and 62 and insure the restoration of the ignition circuit upon the release of the holding dog 24, even though the contacts 59 and 60 should, through inadvertence, remain closed.

Figure 8:
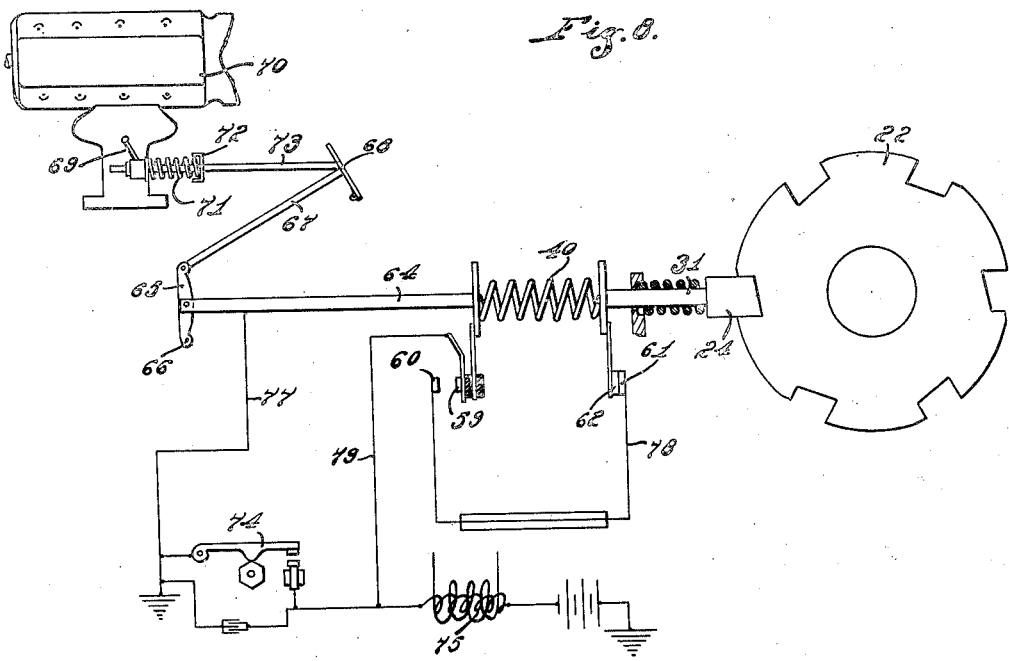
Fig. 8 is a diagrammatic view showing the circuit arrangement of the parts controlled by the mechanism illustrated in Fig. 5.

In order to more fully explain and illustrate the operation of the device, I have illustrated in Fig. 8, more or less diagrammatically, the arrangement of the parts. In this figure, it will be noted that the holding disc 22 is illustrated diagrammatically as is the dog 24 and stem 31. The spring 40 is shown slightly modified and this spring resiliently connects the stem 31 with a movable rod 64 connected to a lever 65, in turn pivoted at 66. This lever 65 is connected, by a push rod 67, with the accelerator pedal 68 of the gasoline engine. The connection between the accelerator pedal and the throttle 69 of the engine 70 includes a spring 71 interposed between a stop 72 on the throttle control rod 73 and a stop on the lever of the throttle 69. This rod 73, as a matter of fact, slides through and is not directly connected with the lever of the throttle. By this arrangement, the throttle is moved to full open position through the medium of the spring 71 and the accelerator pedal 68 can continue in its open direction for the purpose of operating the lever 65.

The circuit breaker of the engine is indicated at 74 and the induction or spark coil is indicated at 75. The stationary contacts 60 and 61 are connected by suitable conductor 78. One side of the circuit breaker is connected by conductor 77 through the rod 64 with movable contact 59 and the movable contact 62 is electrically connected with the rod 64 through the spring 40 and stem 31.

In operation, when the accelerator pedal 68 is moved down to or past full open throttle position, the spring 40, as heretofore explained, is placed under tension and the contacts 59 and 60 closed by the swinging movement of the swinging arms 47, being subsequently reopened, as heretofore described. As soon as contacts 59 and 60 are closed, however, a short circuit will be established over conductor 79, contacts 59 and 60, conductors 78, contacts 61 and 62, spring 40, rods 64 and conductor 77 to the opposite side of the circuit breaker 74. It is thus seen that a short circuit is momentarily established around the circuit breaker and therefore the engine ignition is momentarily interrupted. Due to this momentary interruption of the ignition, the engine will momentarily "miss," thereby relieving the driving shaft 1 of its driving torque and thus placing the holding dog 24 in no-load condition. It being remembered that the spring 40 at this time is under tension, as soon as the no-load condition exists on the dog 24, the spring 40 will move the dog 24 to its released position. This movement of the dog 24 to its released position will, at the same time, open contacts 61 and 62, thus insuring the opening of the short circuit around the circuit breaker.

With the dog 24 in released position, the sun gear of the planetary gearing is no longer operative and the planetary gearing is therefore rendered drivingly inoperative so that a direct drive will be established between the driving shaft 1 and the driven shaft 2 through the overrunning clutch heretofore described.

When pressure on the accelerator pedal 68 is released sufficiently to permit the stirrup lever 42 to resume its normal position, thereby placing the spring 40 in no-tension condition, the spring 27 will bias the dog into engaging position. Bearing in mind that the dogs 14 have connected the ring gear with the driven shaft when the throttle is moved toward closed position, there will be a tendency for the driven shaft 2 to overrun the driving shaft 1 and drive the sun gear holding disc 22 in a reverse direction. This reverse movement of the sun gear holding disc will cause, due to the configuration of the dog 24 and its associated slots 23, the dog 24, under the influence of the coiled spring 27, to reengage one of the slots or recesses 23, thus locking the sun gear against rotation and establish the normal relation of the parts to permit the continued driving of the shaft 2 through the planetary gearing.

Figure 9:
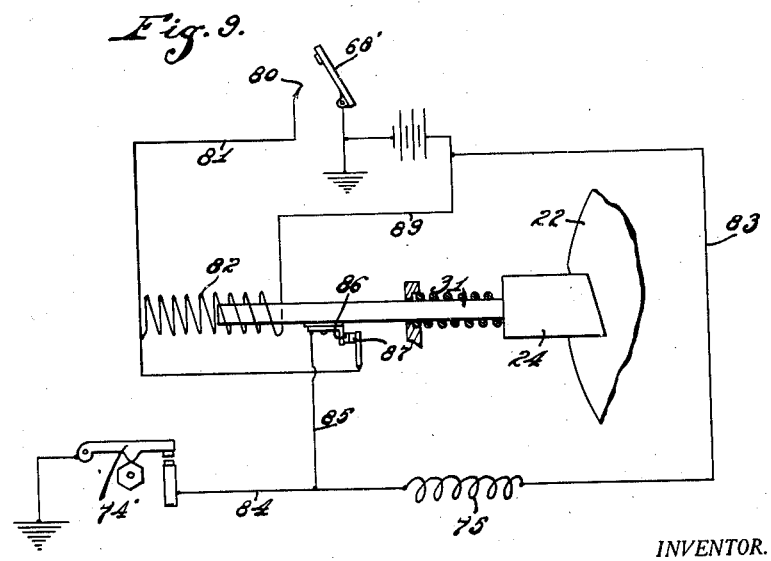
Fig. 9 is a diagrammatic view of a modification thereof.

In Fig. 9, I have illustrated diagrammatically a modification of my invention whereby the dog 24 is adapted to be moved to released position by a solenoid. In this structure, the accelerator pedal 68' is adapted to engage, after it has been moved to full open throttle position, a stationary contact 80. This contact is connected, through the conductor 81, with one terminal of the winding 82 of a solenoid, the core of which is connected to the stem 31 of the dog 24. The accelerator pedal 68' is connected to one terminal of the battery. The opposite terminal of the battery is connected by conductor 83 through the primary winding of the induction coil 75 with one terminal of the circuit breaker 74', the opposite terminal circuit breaker being connected to ground. This stationary terminal of the circuit breaker is connected by conductors 84 and 85 with a movable contact 86 mounted on the stem 31 and the conductor 81 is connected with a relatively stationary contact 87. When the accelerator pedal 68' is moved to engage contact 80, circuit will be established from one side of the battery through conductor 81, solenoid 82 and conductor 89 to the opposite side of the battery, thereby energizing the solenoid winding 82. A bias is therefore placed on the dog 24 to move the same into released position. At the same time that the above circuit is established, a short circuit is established around the circuit breaker by the way of conductors 84 and 85, contacts 86 and 87, conductor 81, contact 80 and accelerator pedal 68'. The engine is therefore caused to "miss," relieving the driving torque on the dog 24 and permitting it to be moved to released position. As soon as the dog 24 moves to released position, the contacts 86 and 87 are opened, thereby opening this short circuit around the circut breaker and restoring the engine ignition.

After the vehicle has reached certain predetermined speed, the difference between the accelerating efficiency of the vehicle being driven through the overdrive or by direct drive is so slight as to be negligible and under these circumstances, it is not necessary, and perhaps even not desirable, that direct drive should be established. Under these circumstances and in order to cut out the short-circuiting switch shown in Figs. 5, 6 and 7, I have provided additional contacts 90 and 90' in the circuit of the short-circuiting switch. One of these contacts, 90, is mounted on a movable arm 91 which is placed directly in the rear of the cooling fan for the engine. This arm is normally held in closed contact position by the coiled spring 92. However, when the engine reaches a predetermined high speed, the fan delivers sufficient air pressure against the scoop arm 91, thereby moving the contact 90 to open contact position, thus opening the circuit entirely through the switch, heretofore illustrated in Figs. 5, 6 and 7, and designated in Fig. 10 as 93. Therefore, even though the accelerator should be pushed to a position to cause the switch 93 to operate, the ignition circuit of the engine would not be short-circuited and there would not be imposed on the dog 24 no-load condition.

In Fig. 11, I have illustrated my invention as applied to another form of transmission. In this structure, the driving shaft is illustrated at 1' and the driven shaft is indicated at 2'. A jack shaft 94 has mounted thereon a driving gear 95 connected to the hub 96 splined on the shaft 94 through the intervention of an overrunning clutch 97. This gear 95 is driven from the driving shaft through the gear 98. A second gear 99 is mounted on the hub 96 which gear meshes with a gear 100 mounted on the driven shaft 2'. In addition to the above, a third gear 101 is mounted on a hub 102 rotatably mounted on the shaft 94 and driven from the gear 99 through an overrunning clutch 104. The gear 100 is rotatably mounted on the shaft 2' and a gear 105 is splined on the shaft 2' but axially movable thereon.

When the gear 105 has been axially moved to mesh with the gear 101, the shaft 2' will be driven at low gear speed. When the clutch members 106 and 107 are engaged, the clutch member 106 being splined on shaft 2', the shaft 2' is driven at second gear speed. When the clutch members 108 and 109 are in engagement, the clutch member 108 being splined on shaft 2', direct drive is established between shaft 1' and 2'. The clutch members 106 and 107 and 108 and 109 are of the so-called "Maybach" type, which are of such a construction as to engage when the members are rotating at substantially synchronous speeds and the clutch members 108 and 109 are so arranged that they will only release when operating under no-load condition.

These clutch members are adapted to be automatically operated for shifting from low gear speed to second and from second to direct. To this end, I provide a shift rod 110 biased in its retracted position by a spring 111 and moved into its shifting positions by means of a governor 112 driven from the driven shaft 2'. This governor operates through the means of a bell crank lever 113 to shift the rod 110. The clutch member 106 is shifted by a shift fork connected to a hub 114 between which and a stationary member 114' on the rod 110 is interposed a coiled spring 115, so that, after low gear speed is established through a manual shift of the gear 105 and 101 into engagement, the governor, when the shaft 2' has reached a predetermined speed, will place the spring 115 under compression shifting the clutch 106 into engaging position whereby, when through suitable operation of the accelerator pedal, the shafts are caused to synchronize the clutches 106 and 107 driving the driven shaft through the next higher gear train. The clutch 108 is operated by a shift fork connected to a hub 116 surrounding an enlarged portion 117 on the shift rod 110. Interposed between this enlarged portion and the hub 114 is a coiled spring 118 which, at one end, engages a collar 119 larger in diameter than the hub 117. Therefore during the engaging movement of the rod 110 to engage clutches 106 and 107 the shift rod, due to the enlarged hub 117, will not affect the hub 116. However, as the speed of the drive shaft 2' increases causing the rod 110 to be shifted further to the left, the collar 119 will eventually engage the hub 116 causing the clutches 109 and 108 to engage establishing direct drive between shafts 1' and 2'.

In event it should be desired to shift back into second gear drive without slowing down the speed of the driven shaft 2' sufficiently to cause the governor 112 to operate the shift mechanism, the operator may do so by moving the accelerator pedal 68" to or past full open position. In doing so the operator moves the contact 120 to the point where it engages the stationary contact 120' corresponding in effect to the movable and stationary contacts 59 and 60 of Fig. 8. This movement through the coiled spring 121 moves the pivoted lever 122 into engagement with the end of the shift rod 110 thereby placing the shift rod under the influence of the compressed spring 121 and tending to bias the shift rod to the right, looking at Fig. 11. The closing of contacts 120 and 120' will, as has heretofore described, short circuit the circuit breaker causing the engine to momentarily miss thereby relieving the driving torque between the clutch members 108 and 109. With this torque relieved the spring 121 will be sufficiently strong to disengage clutch members 108 and 109 thereby reestablishing the second speed drive. At the same time that this shift occurs the lever 122 will be rocked to the left thereby opening contacts 123 and 124 thus opening the short circuit around the ignition and restoring the ignition system to normal.

It is sometimes found desirable, instead of providing a momentary interruption to the ignition circuit in the manner described with respect to Fig. 6, to completely interrupt the ignition circuit until the dog 24 has been moved to its full released position. Therefore the cam 54, of the structure illustrated in Figs. 5 to 7 inclusive, is modified as illustrated in Fig. 12. In this arrangement it will be noted that the cam 54' is provided with a cam surface 125 so arranged that the contacts 59' and 60' will not be closed until the levers 47' have been swung to the limit of their outward movement. When they have reached this outward movement the contacts 59' and 60' will be closed and the shorting of the circuit breaker will continue until the dog 24 has been moved to its released position at which position the short circuit will be interrupted by the opening, as heretofore described, of the contacts 61 and 62.

In Fig. 13, I have illustrated a further modification of my invention wherein I provide electromagnetic means for removing the dog 24 into released position. As shown in this figure, the stem 31 of the dog 24 has connected thereto at its upper end an armature core 125 surrounded by solenoid winding 126 enclosed by an iron shroud 127. The core 125 operates a switch operating stem 128 surrounded by a secondary armature 129 between which and the core 125 is a coiled spring 130 normally biasing the dog 24 in its engaged position. This stem 128 carries at its outer end a collar having a comparatively wide groove 131 within which operates one end 132 of a bell crank lever pivoted at 133 to a stationary part, preferably mounted on the shroud 127. Due to the width of the groove 131, there is a certain amount of lost motion between the collar and the arm 132 of the bell crank lever. The opposite arm 134 of the bell crank lever carries a pair of contacts 135 and 136. Normally, the contact 135 is in engagement with a relatively stationary contact 137 biased in engaging position with the contact 134 by a coiled spring 138 and mounted on a stem 139 having a slight movement. The armature 129 operates a second bell crank lever 140 carrying a contact 141 adapted under certain conditions to engage contact 136. The accelerator pedal 68" is adapted to close the circuit between the ground and a stationary contact 80', as in the structure illustrated in Fig. 9.

The circuit breaker 74" and the primary winding 75' of the ignition circuit of the engine is illustrated as in Fig. 9.

In operation, when the accelerator pedal 68" has been moved past full open throttle position, it will engage contact 80', thereby establishing a circuit through the solenoid winding 126 including the contacts 135 and 137. As soon as the solenoid 126 is energized, it biases the dog 24 into released position but, due to the fact that this dog, under these conditions, is operating under load conditions, it will not be withdrawn from the recess in the disc 22. However, under these conditions, the solenoid 126 attracts the secondary armature 129 which rocking the lever 140 closes the contacts 136 and 141, thereby establishing a short circuit around the distributor and thus interrupting the ignition circuit causing the engine to "miss." Under these circumstances, the driving shaft is relieved of driving torque, thereby permitting the solenoid 126 to move the dog 24 into released position and when so moved, the arm 132 of the bell crank lever will be kicked to the left, looking at Fig. 13, opening not only the circuit established between contacts 141 and 136 but also the circuit established between the contacts 135 and 137, thereby restoring the ignition system and, at the same time, opening the solenoid circuit.

Due to the shape of the pawl or dog 24, as soon as it is moved to released position, permitting the disc 22 to immediately start to rotate, the dog 24 will be maintained in its released position as heretofore described.

If it is desired to again return to overdrive through the planetary gear, all that is necessary is for the operator to move the throttle to closed position, thereby causing the dog to move to engaged position under the influence of the spring 130 in the manner heretofore described.

It is to be understood that where the expression "fully closed" or "effective fully closed" appears in the appended claims, this expression is to be taken in its normal acceptance of the term, namely, that the throttle member is closed to the point where the engine is throttled down to idling speed, and does not mean that the entire flow of fuel to the engine is completely shut off.

I claim as my invention:

1. In a vehicle driving system, the combination with an engine and a driving shaft driven from said engine, of a driven shaft, driving means associated with said shafts for driving said driven shaft from the driving shaft including a gearing for driving said driven shaft from the driving shaft at a different speed from that of said driving shaft, connecting members which when engaged establish one speed between said shafts and when released establish a different speed between said shafts, said connecting members being releasable under no-load conditions, a throttle control member for said engine, and means operated by the movement of said throttle control member in open direction for interrupting and then restoring the driving torque of said engine to permit the release of said connecting members.

2. In a vehicle driving system, the combination with a hydrocarbon engine including an ignition system and a driving shaft driven from said engine, of a driven shaft, driving means associated with said shafts for driving said driven shaft from the driving shaft including a gearing for driving said driven shaft from said driving shaft at a different speed from that of said driving shaft, connecting members which when engaged establish one speed between said shafts and when released establish a different speed between said shafts, said connecting members being releasable only under no-load conditions, and means within the control of the operator for momentarily interrupting and then restoring the ignition system of said engine to thereby relieve said driving shaft of a driving torque and thus momentarily impose no-load conditions on said connecting members.

3. In a vehicle driving system, the combination with an engine and a driving shaft driven from said engine, of a driven shaft, driving means associated with said shafts for driving said driven shaft from the driving shaft including a gearing for driving said driven shaft from the driving shaft at a different speed from that of the driving shaft, connecting members which when engaged establish one speed between said shafts and when released establish a different speed between said shafts, said connecting members being releasable only under no-load condition, means for placing one of said connecting members under bias towards released position, and means operated by the placing of said connecting means under bias for momentarily interrupting the driving torque of said engine to permit said connecting means to release.

4. In a vehicle driving system, the combination with an engine and a driving shaft driven from said engine, of a driven shaft, driving means associated with said shafts for driving said driven shaft from the driving shaft including a gearing for driving said driven shaft from said driving shaft at a different speed from that of the driving shaft, and including connecting members which when engaged establish one speed between said shafts and when released establish a different speed between said shafts, said connecting members being releasable only under no-load conditions, means for biasing said connecting members into released condition, means for interrupting the engine torque to permit said members to release under the influence of said biasing means and a single operating member within the control of the operator for controlling the operation of said biasing means to render the same operative and the operation of said torque interrupting means momentarily interrupt the engine torque.

5. In a vehicle driving system, the combination with an engine having an ignition system and a driving shaft, of a driven shaft driven from said driving shaft, driving means associated with said shafts for driving said driven shaft from the driving shaft including a gearing for driving said driven shaft from the driving shaft at a different speed from that of the driving shaft, connecting members which when engaged establish one speed between said shafts and when released establish a different speed between said shafts, said connecting members being releasable only under no load conditions, biasing means for moving said connecting members into released condition, means within the control of the operator for placing said biasing means into operative condition, and means operated by the rendering of said biasing means operative for interrupting said ignition system, and means operated by the movement of said connecting means into released position for restoring said ignition system.

6. In a vehicle driving system, the combination with a hydrocarbon engine including an ignition system and a driving shaft driven from said engine, of a driven shaft, driving means associated with said shafts for driving said driven shaft from the driving shaft including a gearing for driving said driven shaft from the driving shaft at a different speed from that of said driving shaft, connecting members which when engaged establish one speed between said shafts and when released establish a different speed between said shafts, said connecting members being releasable only under no-load conditions, biasing means for releasing said connecting members, means within control of the operator for rendering said biasing means operative, a switch operated from said operator means for interrupting the engine ignition system and a second switch operated from said connecting members when moved into released position for restoring said ignition system.

7. In a vehicle driving system, the combination with an engine and a driving shaft driven from said engine, of a driven shaft, driving means associated with said shafts for driving said driven shaft from the driving shaft including a gearing for driving said driven shaft from said driving shaft at a different speed from that of said driving shaft, connecting members which when engaged establish one speed between said shafts and when released establish a different speed between said shafts, said connecting members being releasable only under no-load conditions, biasing means for moving said connecting members into released relationship, snap means for interrupting the engine torque, and means within the control of the operator for placing said biasing means in operative relationship and for initiating the movement of said snap means towards its interrupting position.

8. In a vehicle driving system, the combination with a hydrocarbon engine including an ignition system and a driving shaft driven from said engine, a driven shaft, driving means associated with said shafts for driving said driven shaft from the driving shaft including a gearing for driving said driven shaft from said driving shaft at a different speed from that of the driving shaft, connecting members which when engaged establish one speed between said shafts and when released establish a different speed between said shafts, said connecting members being releasable only under no load conditions, a snap switch including a pair of contacts controlling the engine ignition circuit and including a spring for moving said connecting members to released position, and means within the control of the operator for placing said spring under operating tension and for initiating a movement of said switch to a position to interrupt said engine ignition system and a second switch operated by the movement of said connection members to released position under the influence of said spring for restoring said engine ignition system.

9. In a vehicle driving system, the combination with an engine and a driving shaft driven from said engine, of a driven shaft, a planetary gearing associated with said shafts for driving said driven shaft from said driving shaft at a different speed from that of the driving shaft and including a sun gear, means for normally holding said sun gear against rotation to render said gearing operative, holding means for said sun gear releasable only under no-load conditions, and means within the control of the operator for interrupting said engine torque to establish no-load conditions and then automatically restoring said engine torque.

10. In a vehicle driving system, the combination with a driving shaft and a driven shaft, of driving means associated with said shafts for driving said driven shaft from the driving shaft including a gearing for driving said driven shaft from said driving shaft at a different speed from that of the driving shaft, connecting members which when engaged establish one speed between said shafts and when released establish a different speed between said shafts, means within the control of the operator for interrupting the driving torque of said driving shaft, and means without the control of the operator for automatically restoring said driving torque after the connecting means have been released.

11. In a vehicle driving system, the combination with a driving shaft and a driven shaft, of driving means associated with said shafts for driving said driven shaft from the driving shaft including a planetary gearing for driving said driven shaft from said driving shaft at a different speed from that of the driving shaft, a sun gear, holding means for normally holding said sun gear against rotative movement and releasable only under no-load conditions, said driving shaft being driven from an engine having a throttle control member, and means operated by the movement of said throttle control member in an open throttle direction only for interrupting the driving torque on said driving shaft to thereby permit the release of said holding member.

12. In a vehicle driving system, the combination with an engine having a throttle control member and a driving shaft, of a driven shaft, a planetary gearing associated with said shafts for driving said driven shaft from said driving shaft at a different speed from that of the driving shaft, and including a sun gear, means for normally holding said sun gear against rotative movement, an automatic clutch for establishing driving relation between said shafts through said gearing when the driven shaft reaches a predetermined speed, said holding means being releasable only under no-load conditions and means operated by the movement of said throttle member in open throttle direction only for interrupting the driving torque of said engine to thereby permit the release of said holding means and establish a drive between said shafts independent of said gearing without disconnecting said automatic clutch.

13. In a vehicle driving system including a hydrocarbon engine having an ignition system, the combination with a driving shaft and a driven shaft, of a planetary gearing associated with said shaft for establishing a drive between said shafts other than direct and including a sun gear, a dog for holding said sun gear normally against rotative movement and releasable only under no load conditions, a spring for moving said dog to released position, a switch controlling the ignition circuit of said engine, a lever which moves in one direction for placing said coiled spring under tension to move said dog into released position and operate said switch to momentarily interrupt the ignition system of the engine.

14. In a driving system for vehicles including a hydrocarbon engine having an ignition system, a driving shaft driven from said engine and a driven shaft in combination with a planetary gearing for establishing a different speed drive between said shafts and including a sun gear, holding means for said sun gear releasable only under no-load conditions, a coiled spring for moving said holding means into released position, a lever for placing said coiled spring under tension, a switch controlling the ignition switch circuit of said engine, a switch arm for controlling said switch, means for moving said switch to the limit of its movement in either direction after said switch has passed dead center position, and means for moving said switch to past dead center position operated by said lever.

15. In a vehicle driving system, the combination with an internal combustion engine including an ignition system and a driving shaft from said engine, a speed changing gear, a shaft to be driven from said driving shaft, a free wheel clutch for operatively connecting said shafts to provide a one-to-one ratio, a gear mechanism for connecting said shafts capable of planetary movement and provided with a driving connection to bridge the free wheel clutch for providing an overdrive ratio, a shiftable member for locking said free wheel clutch, a brake for holding one member of the overdrive mechanism rotatably stationary to establish driving conditions in said gearing and including interengaging parts releasable under no-load conditions, means for interrupting the ignition system of said engine to establish no-load conditions on said brake, and means for releasing said brake when said no-load conditions exist.

16. In a vehicle driving system, the combination with an internal combustion engine including an ignition system and a driving shaft from said engine, of a shaft to be driven from said driving shaft, a free wheel clutch for operatively connecting said shafts to provide a one-to-one ratio, a gear mechanism for connecting said shafts capable of planetary movement and provided with driving connections to bridge the free wheel clutch for providing an overdrive ratio, said gear mechanism including a sun gear, a shiftable clutch member for locking said free wheel clutch, a brake for holding said sun gear rotatably stationary to establish driving conditions in said gear and including inter-engaging parts releasable under no-load conditions, means for interrupting said ignition system to establish no-load conditions on said brake, and means for releasing said brake when said no-load conditions exist.

17. In a vehicle driving system, the combination with an internal combustion engine including an ignition system and a driving shaft from said engine, a driven shaft to be driven from said driving shaft, a free wheel clutch for operatively connecting said shafts to provide a one-to-one ratio, a gear mechanism for connecting said shafts capable of planetary movement and provided with driving connections to bridge said free wheel clutch for providing an overdrive ratio, a shiftable clutch member for locking said free wheel clutch, a brake for holding one member of the overdrive gear mechanism rotatably stationary to establish driving conditions in said gearing and including inter-engaging parts releasable under no-load conditions, and a single control element for effecting a momentary interruption to said ignition system for establishing no-load conditions on said brake and for effecting a release of said brake when said no-load conditions exist.

18. In a vehicle driving system, the combination with an internal combustion engine including an ignition system and a driving shaft from said engine, of a shaft to be driven from said driving shaft, a free wheel clutch for operatively connecting said shafts to provide a one-to-one ratio, a gear mechanism for connecting said shafts capable of planetary movement and provided with driving connections to bridge said free wheel clutch for providing an overdrive ratio, said planetary gearing including a sun gear, a shiftable clutch member locking said free wheel clutch, a brake for holding said sun gear rotatably stationary to establish driving conditions in said gearing and including inter-engaging parts releasable under said no-load conditions, and a single control element for effecting a momentary interruption to said ignition system for establishing no-load conditions on said brake and for effecting a release of said brake when said no-load conditions exist.

19. In a vehicle driving system, the combination with an internal combustion engine including an ignition system and a driving shaft from said engine, of a driven shaft, a planetary gearing for establishing a drive between said shafts, a brake for holding one member of said gearing stationary for establishing driving conditions in said gearing and including inter-engaging parts releasable under substantially no-load conditions, a single control member for effecting an interruption of said engine torque to establish no-load conditions on said brake and for effecting a release of said brake when said no-load conditions exist, and means operated by the release of said brake for restoring said engine torque.

20. In a vehicle driving system, the combination with an internal combustion engine including an ignition system and a driving shaft from said engine, of a driven shaft, a planetary gearing for establishing a drive between said shafts, a brake for holding one member of said gearing stationary for establishing driving conditions in said gearing and including inter-engaging parts releasable under substantially no-load conditions, and a single control member for effecting a momentary interruption of the ignition system to establish no-load conditions on said brake and for effecting a release of said brake when said no-load conditions exist.

21. In a vehicle driving system, the combination with an internal combustion engine including an ignition system and a driving shaft from said engine, of a driven shaft, a planetary gearing for establishing a drive between said shafts and including a sun gear, a brake for holding said sun gear rotatably stationary for establishing driving conditions in said gearing and including inter-engaging parts releasable under substantially no-load conditions, a single control member for effecting an interruption of said engine torque to establish said no-load conditions on said brake and for effecting a release of said brake when said no-load conditions exist, and means operated by the release of said brake for restoring said torque.

22. In a vehicle driving system, the combination with an internal combustion engine including an ignition system and a driving shaft from said engine, of a driven shaft, a planetary gearing for establishing a drive between said shafts and including a sun gear, a brake for holding said sun gear rotatably stationary for establishing driving conditions in said gearing and including inter-engaging parts releasable under substantially no-load conditions, and a single control member for effecting a momentary interruption of said ignition system to establish no-load conditions on said brake and for effecting a release of said brake when said no-load conditions exist.

23. In a vehicle driving system, the combination with an internal combustion engine including an ignition system, a throttle control member and a driving shaft from said engine, of a driven shaft, a planetary gearing for establishing a drive between said shafts, a brake for holding one member of said gearing stationary for establishing driving conditions in said gearing and including inter-engaging parts releasable under substantially no-load conditions, and means controlled by said throttle control member for effecting a momentary interruption of said ignition system to establish no-load conditions on said brake and for effecting a release of said brake when said no-load conditions exist.

24. In a vehicle driving system, the combination with an internal combustion engine including an ignition system, a throttle control member and a driving shaft from said engine, of a driven shaft, a planetary gearing for establishing a drive between said shafts including a sun gear, a brake for holding said sun gear stationary for establishing driving conditions in said gearing and including inter-engaging parts releasable under substantially no-load conditions, and means controlled by said throttle control member for momentarily effecting an interruption of said ignition system for establishing no-load conditions and for releasing said inter-engaging parts when said no-load conditions exist.

25. In a vehicle driving system, the combination with an internal combustion engine including an ignition system and a driving shaft from said engine, of a driven shaft, a planetary gearing for establishing a drive between said shafts, a brake for holding one member of said gearing stationary for establishing driving conditions in said gearing and including inter-engaging parts releasable under substantially no-load conditions, a solenoid for controlling the operation of said inter-engaging parts and a single control member for effecting a momentary interruption of said ignition system for establishing no-load conditions on said brake and for rendering said solenoid operative for releasing said brake during the existence of said no-load conditions.

26. In a vehicle driving system, the combination with an internal combustion engine including an ignition system and a driving shaft from said engine, of a driven shaft, a planetary gearing for establishing a drive between said shafts, a brake for holding one member of said gearing stationary for establishing driving conditions in said gearing and including inter-engaging parts releasable under substantially no-load conditions, means for interrupting said ignition system to establish no-load conditions on said brake, means for effecting a release of said brake under said no-load conditions, and means for reestablishing said ignition system operated by the release of said brake.

27. In a vehicle driving system, the combination with an internal combustion engine including an ignition system and a driving shaft from said engine, of a driven shaft, a gearing for establishing driving connections between said shafts, inter-engaging means which when in one position rendered said gearing operative and in another position render said gearing inoperative and releasable under substantially no-load conditions, an electro-magnet for effective operation of said inter-engaging means, means for interrupting the ignition system for establishing no-load conditions on said parts and for rendering said electro-magnet effective to release said interengaging members under said no-load conditions, and means for re-establishing said ignition system upon the release of said interengaging members.

28. In a vehicle driving system, the combination with an internal combustion engine including an ignition system and a driving shaft from said engine, of a driven shaft, a planetary gearing for establishing a drive between said shafts, a brake for holding one member of said gearing stationary for establishing driving conditions in said gearing and including inter-engaging parts releasable under substantially no-load conditions, an electro-magnet for controlling the operation of said brake, means for interrupting the ignition system for establishing no-load conditions on said parts, means for rendering said electro-magnet effective to release said brake when said no-load conditions are established, and means for restoring said ignition system upon the release of said brake by said electro-magnet.

29. In a vehicle driving system, the combination with an internal combustion engine including an ignition system and a driving shaft from said engine, of a driven shaft, a one-way clutch for establishing a drive between said shafts, a planetary gearing for establishing a higher speed drive between said shafts and including a sun gear, a brake for holding said sun gear against rotation to establish driving conditions in said gearing and including inter-engaging parts releasable under substantially no-load conditions, an electro-magnet for operating said brake, means for interrupting the ignition system of said engine for establishing no-load conditions on said brake and for rendering said electromagnet effective to release said brake when said no-load conditions are established, and means operated by the release of said brake for the restoration of said ignition system.

30. In a vehicle driving system, the combination with an internal combustion engine including an ignition system and a driving shaft from said engine, a driven shaft, a planetary gear for establishing a drive between said shafts, means responsive to the speed of the vehicle for rendering said planetary gear effective, said gearing including a sun gear, a brake for holding said sun gear rotatably stationary and including inter-engaging parts releasable under substantially no-load conditions and a single control member for effecting a momentary interruption to said ignition system and for effecting a release of said brake when said no-load conditions exist.

31. In a vehicle driving system, the combination with an internal combustion engine including an ignition system and a driving shaft from said engine, a driven shaft, a planetary gearing for establishing a drive between said shafts, means responsive to the speed of the vehicle for rendering said planetary gear effective, a brake for holding a member of said planetary gearing rotatably stationary and including inter-engaging parts releasable under substantially no-load conditions, and a single control member for effecting a momentary interruption to said ignition system and for effecting a release of said brake when said no-load conditions exist.

32. In a vehicle driving system, the combination with an internal combustion engine including an ignition system and a driving shaft from said engine, a driven shaft, a gearing for establishing a drive between said shafts, automatic means responsive to the speed of the vehicle for rendering said gearing effective, inter-engaging parts releasable under substantially no-load conditions which in one position render said gearing operative and in another position render said gearing inoperative, and a single control member for effecting a momentary interruption to said ignition system and for effecting a release of said inter-engaging parts when said no-load conditions exist.

33. In a power transmission for driving a motor vehicle having an engine provided with a throttle valve; a driving shaft adapted to receive drive from the engine; a driven shaft adapted to drive the vehicle; speed responsive clutch means including driving and driven clutching members adapted for clutching engagement; means for drivingly connecting one of said clutching members with the driving shaft; means for drivingly connecting the other of said clutching members with the driven shaft; one of said driving-connecting-means comprising gearing for driving the driven shaft from the driving shaft at a speed different from that of the driving shaft when said clutching members are engaged; driver operated means for adjusting the engine throttle valve; and drive control means including an electrically controlled prime-mover operable in response to operation of said throttle valve adjusting means for rendering said different speed drive inoperative.

34. In a drive for a motor vehicle having an engine provided with a throttle valve actuator operable by the driver throughout a range of movement in adjusting the throttle valve between its effective fully opened and closed positions; means accommodating driver operation of said throttle valve actuator throughout its said range of movement and therebeyond in a second range of movement overtravelling the effective full opening of the throttle valve; a driving shaft adapted to receive drive from the engine; a driven shaft adapted to drive the vehicle; speed controlled clutch means including driving and driven clutching members adapted for clutching engagement; means for drivingly connecting one of said clutching members with the driving shaft; means for drivingly connecting the other of said clutching members with the driven shaft; one of said driving connecting means comprising gearing for driving the driven shaft from the driving shaft at a speed different from that of the driving shaft when said clutching members are engaged; and drive control means including an electrically controlled prime mover operator operable in response to drive operation of said throttle valve actuator in said second range of movement for effecting discontinuance of said different speed drive.

35. In a drive for a motor vehicle having an engine provided with a throttle valve actuator operable by the driver throughout a range of movement in adjusting the throttle valve between its effective fully opened and closed position; means accommodating driver operation of said throttle valve actuator throughout its said range of movement and therebeyond in a second range of movement overtravelling the effective throttle valve; a driving shaft adapted to receive drive from the engine; a driven shaft adapted to drive the vehicle; gearing means operable to drive the driven shaft from the driving shaft; a clutch engageable to effect the drive through said gearing means in response to operation of said throttle valve actuator in its first said range of movement; means including a solenoid operable in response to operation of said throttle valve actuator in its second said range of movement for effecting release of the drive through said gearing means while maintaining engagement of said clutch; and means responsive to movement of said actuator from said second range of movement for restoring the drive through said gearing.

36. In a power transmission for driving a motor vehicle having an internal combustion engine and a driver operable engine throttle control; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including positively engageable drive control elements operably associated therewith and adapted when engaged to establish said relatively fast speed drive, said elements when engaged being subjected to thrust-transmission therebetween during said relatively fast speed drive so as to resist disengagement of said elements to release this drive until the power delivery of the engine is momentarily interrupted; said relatively slow speed driving means including a control device operating automatically to establish this drive in response to release of said relatively fast speed driving means; solenoid operating means adapted to effect disengagement of said elements thereby to release said relatively fast speed driving means; and means operating in response to driver operation of said throttle control for effecting operation of said solenoid operating means and for momentarily interrupting the power delivery of said engine thereby to step-down the drive through relatively fast speed driving means and operation of said relatively slow speed driving means.

37. In a power transmission for driving a motor vehicle having an internal combustion engine and a driver operable engine throttle control operable throughout a range of movement in adjusting the throttle valve between its effective fully opened and closed position, means accommodating driver operation of said throttle control throughout its said range of movement and therebeyond in a second range of movement; a driving shaft adapted to receive drive from the engine and a driven shaft adapted to drive the vehicle; relatively low speed driving means for driving the driven shaft from the driving shaft; relatively fast speed driving means for driving the driven shaft from the driving shaft at a speed faster than that provided by said slow speed driving means, including positively engageable drive control elements operably associated therewith and adapted when engaged to establish said relatively fast speed drive, said elements when engaged being subjected to thrust-transmission therebetween during said relatively fast speed drive so as to resist disengagement of said elements to release this drive until the power delivery of the engine is momentarily interrupted; said relatively slow speed driving means including a control device operating automatically to establish this drive in response to release of said relatively fast speed driving means; solenoid operating means adapted to effect disengagement of said elements thereby to release said relatively fast speed driving means; and means operating in response to driver operation of said throttle control in its said second range of movement for effecting operation of said solenoid operating means and for momentarily interrupting the power delivery of said engine thereby to step-down the drive through the transmission by effecting release of said relatively fast speed driving means and operation of said relatively slow speed driving means.

38. In a power transmission for driving a motor vehicle having an internal combustion engine provided with an electrical ignition circuit and a driver operable engine throttle control; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including positively engageable drive control elements operable associated therewith and adapted when engaged to establish said relatively fast speed drive, said elements when engaged being subjected to thrust-transmission therebetween during said relatively fast speed drive so as to resist disengagement of said elements to release this drive until the thrust-transmission therebetween is relieved; said relatively slow speed driving means including a control device operating automatically to establish this drive in response to release of said relatively fast speed driving means; solenoid operating means adapted to effect disengagement of said elements thereby to release said relatively fast speed driving means; and means operating in response to driver operation of said throttle control for effecting operation of said solenoid operating means and for momentarily interrupting said ignition circuit to relieve the thrust-transmission between said elements thereby to step-down the drive through the transmission by effecting release of said relatively fast speed driving means and operation of said relatively slow speed driving means.

39. In a power transmission for driving a motor vehicle having an internal combustion engine and a driver operable engine throttle control; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including positively engageable drive control elements operably associated therewith and adapted when engaged to establish said relatively fast speed drive, said elements when engaged being subjected to thrust-transmission therebetween during said relatively fast speed drive so as to resist disengagement of said elements to release this drive until the drive torque in said transmission is reversed; said relatively slow speed driving means including a control device operating automatically to establish this drive in response to release of said relatively fast speed driving means; solenoid operating means adapted to effect disengagement of said elements thereby to release said relatively fast speed driving means; and means operating in response to driver operation of said throttle control for effecting operation of said solenoid operating means and for reversing the drive torque in said transmission thereby to step-down the drive through the transmission by effecting release of said relatively fast speed driving means and operation of said relatively slow speed driving means.

40. In a power transmission for driving a motor vehicle having an internal combustion engine and driver operable control means; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including positively engageable drive control elements operably associated therewith and adapted when engaged to establish said relatively fast speed drive, said elements when engaged being subjected to thrust-transmission therebetween during said relatively fast speed drive so as to resist disengagement of said elements to release this drive until the thrust transmission therebetween is relieved; said relatively slow speed driving means including a control device operating automatically to establish this drive in response to release of said relatively fast speed driving means; solenoid operating means adapted to effect disengagement of said elements thereby to release said relatively fast speed driving means; and means operating in response to operation of said control means for effecting operation of said solenoid operating means and for relieving the thrust-transmission between said elements thereby to step-down the drive through the transmission by effecting release of said relatively fast speed driving means and operation of said relatively slow speed driving means.

41. In a power transmission for driving a motor vehicle having an internal combustion engine provided with an electrical ignition circuit and a driver manipulated engine throttle control operable throughout a range of movement in adjusting the throttle valve between its effective fully opened and closed positions, means accommodating driver operation of said throttle control throughout its said range of movement and therebeyond in a second range of movement; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including positively engageable drive control elements operably associated therewith and adapted when engaged to establish said relatively fast speed drive, said elements when engaged being subjected to thrust-transmission therebetween during said relatively fast speed drive so as to resist disengagement of said elements to release this drive until the power delivery of the engine is momentarily interrupted; said relatively slow speed driving means including a control device operating automatically to establish this drive in response to release of said relatively fast speed driving means; solenoid operating means adapted to effect disengagement of said elements thereby to release said relatively fast speed driving means; and means operating in response to driver manipulation of said throttle control in its said second range of movement for effecting operation of said solenoid operating means and for momentarily interrupting the power delivery of said engine thereby to step-down the drive through the transmission by effecting release of said relatively fast speed driving means and operation of said relatively slow speed driving means, said relatively slow speed driving means control device being operable to accommodate engagement of said elements to establish said relatively fast speed driving means in response to movement of said throttle control from its said second range of movement.

42. In a drive for a motor vehicle having an engine provided with a driver operated engine throttle control; transmission mechanism operable to provide a drive from the engine to the vehicle, said mechanism including positively engageable drive control elements adapted when engaged to establish said drive, said elements when engaged being subjected to thrust-transmission therebetween during said drive so as to resist disengagement of said elements to release the drive until the thrust-transmission therebetween is relieved; solenoid operating means adapted to effect disengagement of said elements thereby to release said drive; and means operating in response to driver operation of said throttle control for effecting operation of said solenoid operating means and for relieving said thrust-transmission.

43. In a drive for a motor vehicle having an engine provided with a driver operated engine throttle control operable throughout a range of movement in adjusting the throttle valve between its effective fully opened and closed positions, means accommodating driver operation of said throttle control throughout its said range of movement and therebeyond in a second range of movement; transmission mechanism operable to provide a drive from the engine to the vehicle, said mechanism including positively engageable drive control elements adapted when engaged to establish said drive, said elements when engaged being subjected to thrust-transmission therebetween during said drive so as to resist disengagement of said elements to release the drive until the thrust-transmission therebetween is relieved; solenoid operating means adapted to effect disengagement of said elements thereby to release said drive; and means operating in response to driver operation of said throttle control in its said second range of movement for effecting operation of said solenoid operating means and for relieving said thrust-transmission.

44. In a drive for a motor vehicle having an engine provided with an electrical ignition circuit and a driver operated engine throttle control operable throughout a range of movement in adjusting the throttle valve between its effective fully opened and closed positions, means accommodating driver operation of said throttle control throughout its said range of movement and therebeyond in a second range of movement; transmission mechanism operable to provide a drive from the engine to the vehicle, said mechanism including positively engageable drive control elements adapted when engaged to establish said drive, said elements when engaged being subjected to thrust-transmission therebetween during said drive so as to resist disengagement of said elements to release the drive until the thrust therebetween is relieved; solenoid operating means adapted to effect disengagement of said elements thereby to release said drive; and means operating in response to operation of said driver operated throttle control in its said second range of movement for effecting operation of said solenoid operating means and for momentarily interrupting said ignition circuit to relieve said thrust-transmission.

45. In a drive for a motor vehicle having an engine and driver operated control means, transmission mechanism operable to provide a drive from the engine to the vehicle, said mechanism including positively engageable drive control elements adapted when engaged to establish said drive, said elements when engaged being subjected to thrust-transmission therebetween during said drive so as to resist disengagement of said elements to release the drive until the thrust therebetween is relieved; solenoid operating means adapted to effect disengagement of said elements thereby to release said drive; and means operating in response to operation of said driver operated control means for effecting operation of said solenoid operating means and for relieving said thrust-transmission.

46. In a power transmission for driving a motor vehicle having an internal combustion engine and a driver operable engine throttle control; a driving shaft adapted to receive drive from the engine and a driven shaft adapted to drive the vehicle; relatively slow speed driving means for driving the driven shaft from the driving shaft; relatively fast speed driving means for driving the driven shaft from the driving shaft at a speed faster than that provided by said slow speed driving means, including positively engageable drive control elements operably associated therewith and adapted when engaged to establish said relatively fast speed drive, one of said drive control elements being movable relative to the other to establish and release said relatively fast speed drive, said elements when engaged being subjected to thrust-transmission therebetween during said relatively fast speed drive so as to resist disengagement of said elements to release this drive until the power delivery of the engine is momentarily interrupted; said relatively slow speed driving means including a control device operating automatically to establish this drive in response to release of said relatively fast speed driving means; solenoid operating means adapted to move said relatively movable drive control element for controlling operation of said relatively fast speed driving means; means yieldingly opposing movement of said relatively movable drive control element by said solenoid operating means; and means operating in response to driver operation of said throttle control for controlling operation of said solenoid operating means and for momentarily interrupting the power delivery of said engine thereby to step-down the drive through the transmission by effecting release of said relatively fast speed driving means and operation of said relatively slow speed driving means.

47. In a power transmission for driving a motor vehicle having an internal combustion engine and a driver operable engine throttle control operable throughout a range of movement in adjusting the throttle valve between its effective fully opened and closed position, means accommodating the driver operation of said throttle control throughout its said range of movement and therebeyond in a second range of movement, a driving shaft adapted to receive drive from the engine and a driven shaft adapted to drive the vehicle, relatively slow speed driving means for driving the driven shaft from the driving shaft, relatively fast speed driving means for driving the driven shaft at a speed faster than that provided by said slow speed driving means, including positively engageable drive control elements operably associated therewith and adapted when engaged to establish said relatively fast speed drive, said elements when engaged being subjected to thrust transmission therebetween during said relatively fast speed drive so as to resist disengagement of said elements to release this drive until the power delivery of the engine is momentarily interrupted, said relatively slow speed driving means including a control device operable automatically to establish this drive in response to release of said relatively fast speed driving means, means adapted to effect disengagement of said elements thereby to release said relatively fast speed driving means, and means operating in response to driver operation of said throttle control in its second range of movement for effecting operation of said disengaging means and for momentarily interrupting the power delivery of said engine thereby to step-down the drive through the transmission by effecting release of said relatively fast speed drive means and operation of said relatively slow speed driving means.

48. In a power transmission for driving a motor vehicle having an internal combustion engine provided with an electrical ignition circuit and a driver manipulated engine throttle control operable throughout a range of movement in adjusting the throttle valve between its effective fully opened and effective fully closed positions, means accommodating driver operation of said throttle control throughout its said range of movement and therebeyond in a second range of movement, a driving shaft adapted to receive drive from the engine and a driven shaft adapted to drive the vehicle, relatively slow speed driving means for driving the driven shaft from the driving shaft, relatively fast speed driving means for driving the driven shaft from the driving shaft at a speed faster than that provided by said slow speed driving means, including positively engageable drive control elements operably associated therewith and adapted when engaged to establish said relatively fast speed drive, said elements when engaged being subjected to thrust transmission therebetween during said relatively fast speed drive so as to resist disengagement of said elements to release this drive until the power delivery of the engine is momentarily interrupted, said relatively slow speed driving means including a control device operated automatically to establish this drive in response to release of said relatively fast speed driving means, means adapted to effect disengagement of said elements thereby to release said relatively fast speed driving means, and means operating in response to driver manipulation of said throttle control in its second range of movement for effecting operation of said disengaging means and for momentarily interrupting the power delivery of said engine thereby to step-down the drive through the transmission by effecting release of said relatively fast speed driving means and operation of said relatively slow speed driving means, said relatively slow speed driving means control device being operable to accommodate the engagement of said elements to establish said relatively fast speed driving means in response to movement of said throttle control from its second range of movement.

49. In a drive for a motor vehicle having an engine provided with a driver operated engine throttle control operable throughout a range of movement in adjusting the throttle valve between its effective fully opened and effective fully closed positions, means accommodating driver operation of said throttle control throughout its said range of movement and therebeyond in a second range of movement, transmission mechanism operable to provide a drive from the engine to the vehicle, said mechanism including positively engageable drive control elements adapted when engaged to establish said drive, said elements when engaged being subjected to thrust transmission therebetween during said drive so as to resist disengagement of said elements to release the drive until the thrust transmission therebetween is relieved, means adapted to effect disengagement of said elements thereby to release said drive, and means operating in response to driver operation of said throttle control in its second range of movement for effecting operation of said disengaging means and for relieving said thrust transmission.

50. In a drive for a motor vehicle having an engine provided with an electrical ignition circuit and a driver operated engine throttle control operable throughout a range of movement in adjusting the throttle valve between its effective fully opened and closed positions, means accommodating driver operation of said throttle control throughout its said range of movement and therebeyond in a second range of movement, transmission mechanism operable to provide a drive from the engine to the vehicle, said mechanism including positively engageable drive control elements adapted when engaged to establish said drive, said elements when engaged being subjected to thrust transmission therebetween during said drive so as to resist disengagement of said elements to release the drive until the thrust therebetween is relieved, means adapted to effect disengagement of said elements thereby to release said drive, and means operating in response to operation of said driver operated throttle control in its second range of movement for effecting operation of said disengaging means and for momentarily interrupting said ignition circuit to relieve said thrust transmission.

51. In a drive for a motor vehicle having an engine provided with a throttle valve actuator operable by the driver throughout a range of movement in adjusting the throttle valve between its effective fully opened and effective fully closed position, means accommodating driver operation of said throttle valve actuator throughout its said range of movement and therebeyond in a second range of movement overtraveling the effective full opening of the throttle valve, a driving shaft adapted to receive drive from the engine, a driven shaft adapted to drive the vehicle, speed controlled clutch means including driving and driven clutching members adapted for clutching engagement and adapted to drive said driven shaft from the driving shaft at a given speed ratio when engaged, means for preventing engagement of said clutch members until the same have approached substantial synchronism, alternate driving means for driving the driven shaft from the driving shaft at a lower speed ratio when said clutching members are disengaged, and drive control means including an electrically controlled prime mover operable in response to driver operation of said throttle valve actuator in said second range of movement for effecting release of said higher speed ratio.

52. In a drive for motor vehicles having an engine provided with a throttle valve actuator operable by the driver throughout a range of movement in adjusting the throttle valve between its effective fully open and effective fully closed position, means accommodating driver operation of said actuator throughout its range of movement and therebeyond in a second range of movement overtraveling the effective full opening of the throttle valve, a driving shaft adapted to receive a drive from the engine, a driven shaft adapted to drive the vehicle, relatively slow speed and driving means for driving the driven shaft from the driving shaft including automatic clutch means to establish said drive, relatively fast speed driving means for driving the driven shaft from the driving shaft, including engageable members for controlling the drive through said high speed means, a baulk element for preventing engagement of said engageable members until the relative normal directional movement of said members is reversed, said members being releasable to establish said low speed drive, said automatic clutch means establishing said low speed drive when said high speed drive is disconnected, and means for releasing said high speed drive when said throttle valve actuator is moved into its second range of movement.

53. In a drive for motor vehicles having an engine provided with a throttle valve actuator operable by the driver throughout a range of movement in adjusting the throttle valve between its effective fully opened and effective fully closed position, means accommodating driver operation of said actuator throughout its range of movement and therebeyond in a second range of movement overtraveling the effective full opening of the throttle valve, a driving shaft adapted to receive a drive from the engine, a driven shaft adapted to drive the vehicle, relatively slow speed driving means for driving the driven shaft from the driving shaft including automatic clutch means to establish said drive, relatively fast speed driving means for driving the driven shaft from the driving shaft including engageable members for controlling the drive through said high speed means, a baulk element preventing engagement of said engageable members until relatively normal direction of movement thereof is reversed, said members being releasable to establish said low speed drive, said automatic clutch means establishing said low speed drive when said high speed drive is disconnected, and electromagnetically controlled means for releasing said high speed drive when said throttle valve actuator is moved into said second range of movement.

WILLIAM B. BARNES.

Certificate of Correction

Patent No. 2,225,493.  December 17, 1940.

WILLIAM B. BARNES

It is hereby certified that errors appear in the printed specification of the above numbered patent requiring correction as follows: Page 6, second column, line 19, claim 4, after the word "means" insert *to*; page 9, first column, line 37, claim 27, for "effective" read *effecting the*; and that the said Letters Patent should be read with these corrections therein that the same may conform to the record of the case in the Patent Office.

Signed and sealed this 24th day of September, A. D. 1946.

[SEAL]

LESLIE FRAZER,
*First Assistant Commissioner of Patents.*